United States Patent [19]
Goto

[11] 4,229,084
[45] Oct. 21, 1980

[54] TRANSPARENCY CASSETTE AND VIEWER OR PROJECTOR

[76] Inventor: Tadashi Goto, 380, 3-Chome, Tsukagoshi, Kawasaki, Japan

[21] Appl. No.: 645,252

[22] Filed: Dec. 29, 1975

Related U.S. Application Data

[63] Continuation of Ser. No. 597,638, Jul. 21, 1975, abandoned, which is a continuation of Ser. No. 365,109, May 30, 1973, abandoned.

[30] Foreign Application Priority Data

Jun. 14, 1972 [JP] Japan ................................. 47/59142

[51] Int. Cl.³ ...................... G03B 23/02; G09F 11/30
[52] U.S. Cl. .................................. 353/113; 353/120; 353/DIG. 1; 40/511
[58] Field of Search ......... 353/112, 113, 120, DIG. 1; 40/511

[56] References Cited
U.S. PATENT DOCUMENTS 3,862,800   1/1975   Carr ..................................... 353/113

FOREIGN PATENT DOCUMENTS

| | | | |
|---|---|---|---|
| 229736 | 7/1960 | Australia | 353/113 |
| 1195578 | 11/1959 | France | 353/113 |
| 1213012 | 3/1960 | France | 353/113 |
| 633141 | 2/1962 | Italy | 353/113 |

*Primary Examiner*—Steven L. Stephan
*Attorney, Agent, or Firm*—Thomas J. Greer, Jr.

[57] ABSTRACT

A cassette, cartridge, box or magazine for storing and projecting transparencies or slides as well as a viewer or projector, the cassette and the viewer or projector matching each other. Said cassette having two compartments for stacks of slides and a structure connecting said compartments and being provided with a passage for moving the slides one by one from the bottom of one compartment to the other compartment and preferably from the top of the last named compartment to the first named compartment through a second passage. The connecting structure being adapted for attachment to a projector or viewer with a slide in said passage being arranged between a light source and a focussing lens. The viewer or projector being provided with means for pushing the slides one by one from one compartment through the passage into the other compartment.

4 Claims, 16 Drawing Figures

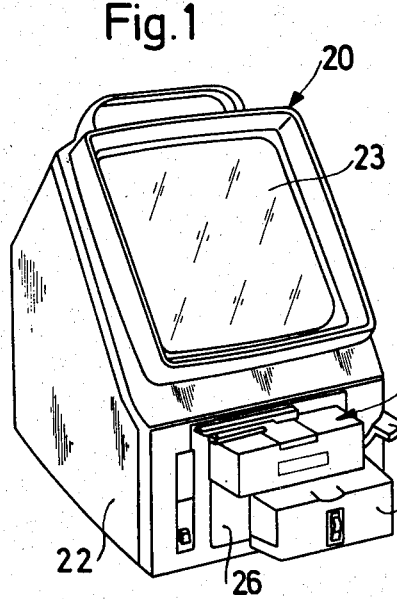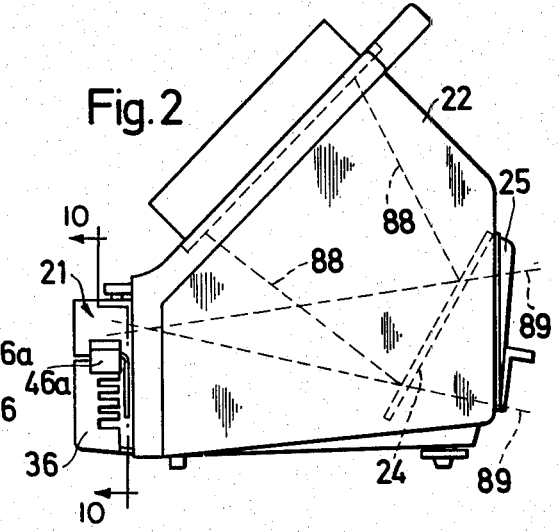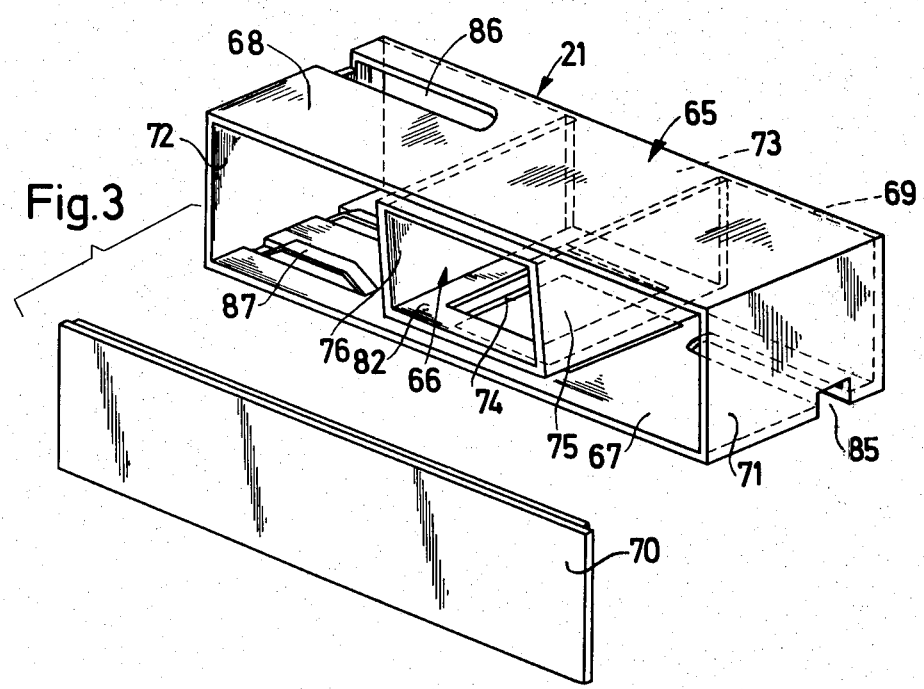

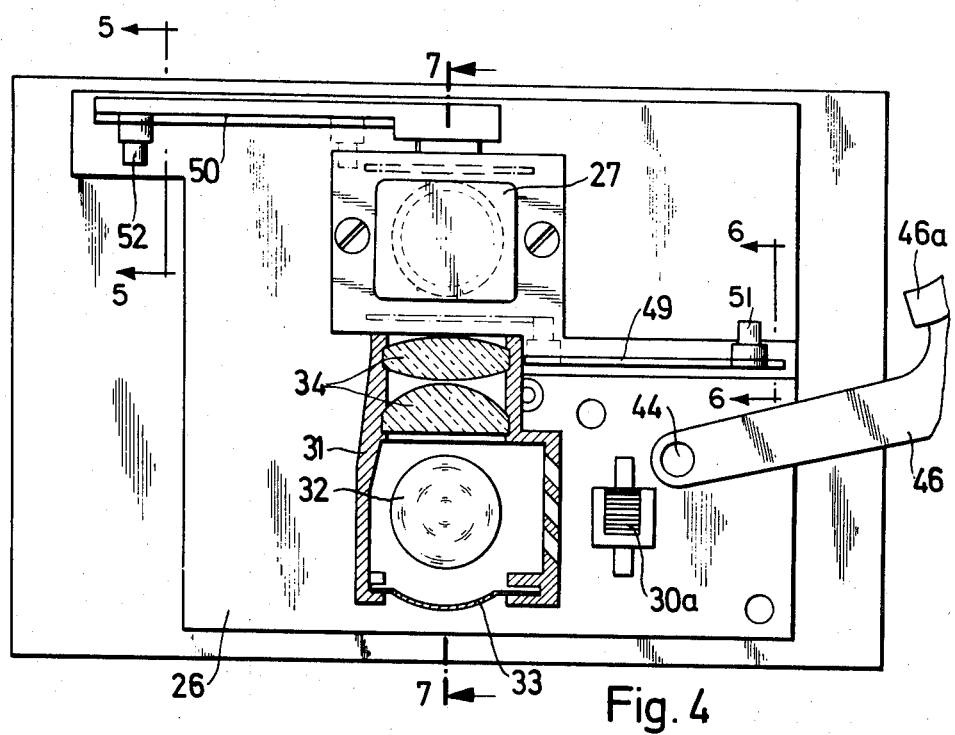
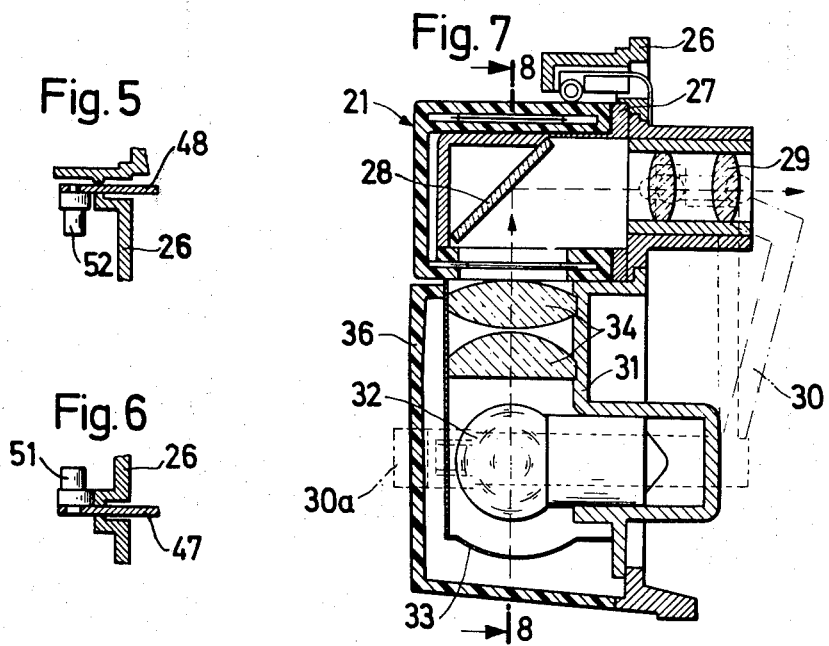

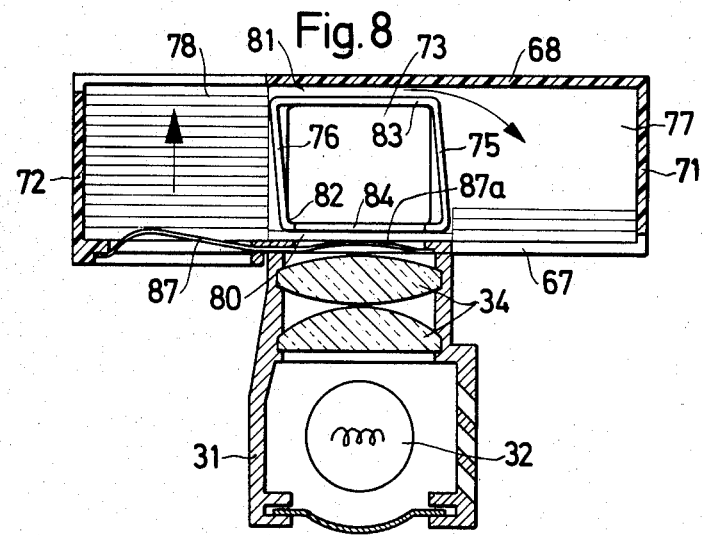
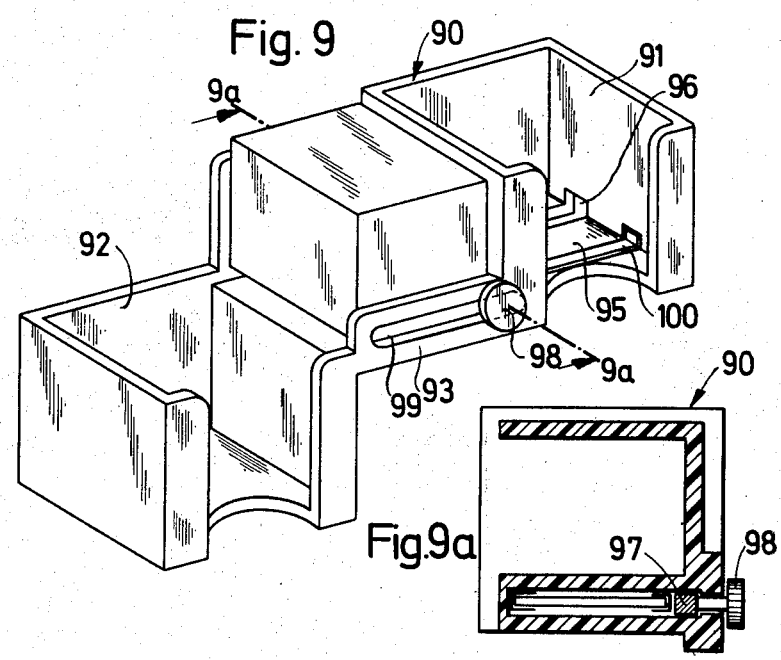

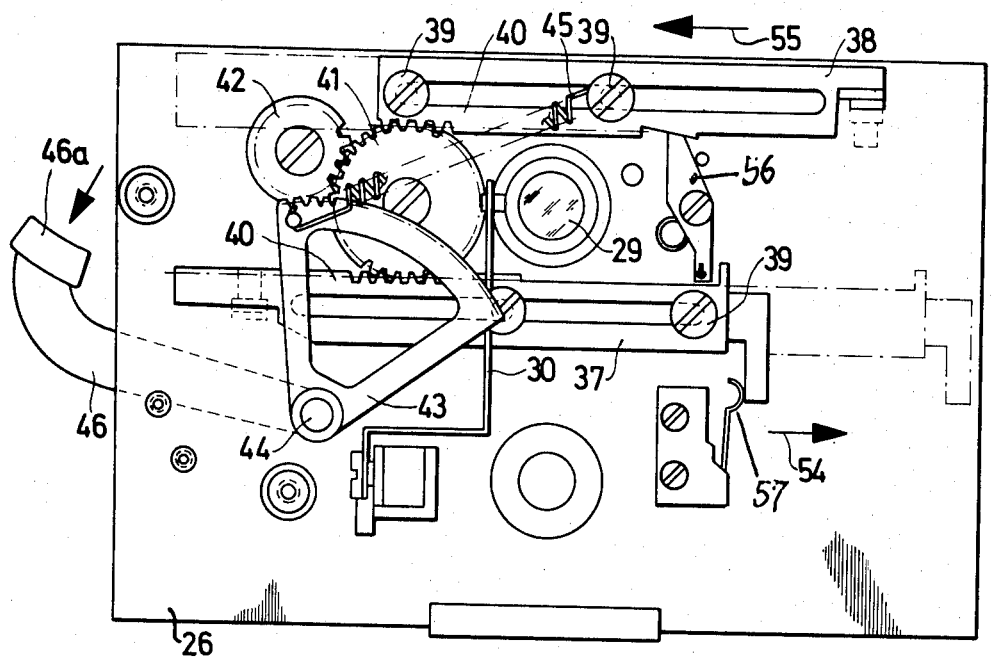
Fig. 10
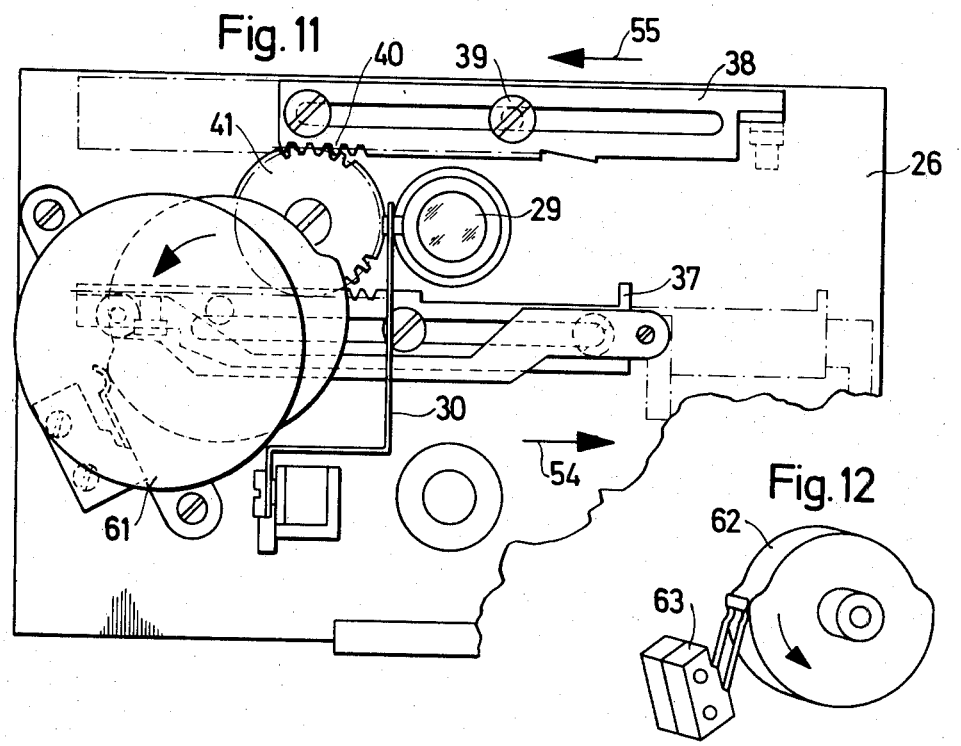
Fig. 11
Fig. 12

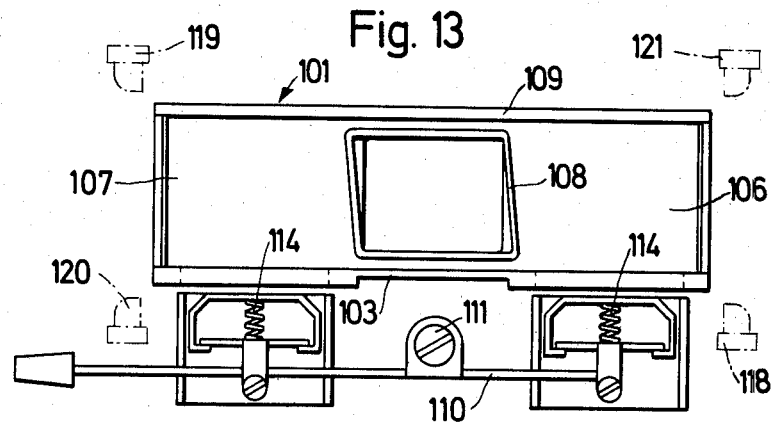
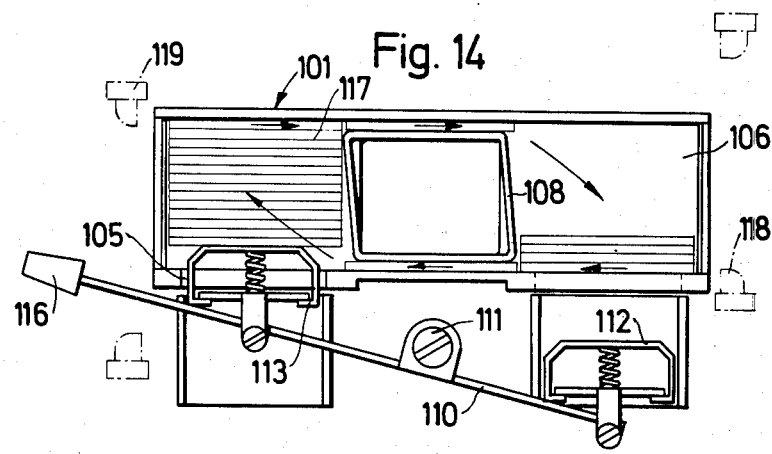
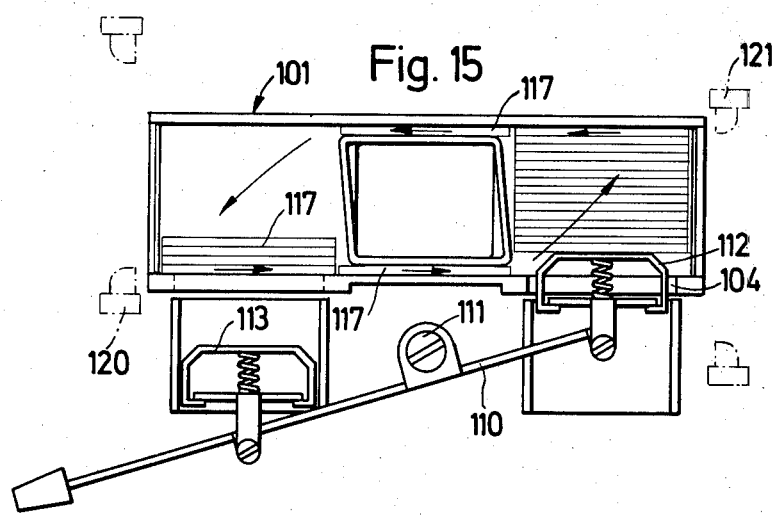

TRANSPARENCY CASSETTE AND VIEWER OR PROJECTOR

This is a continuation of abandoned application Ser. No. 597,638 filed July 21, 1975 which, in turn, was a continuation of abandoned application Ser. No. 365,109 filed May 30, 1973.

The invention relates to a cassette, cartridge, box, magazine or the like for storing and projecting transparencies or slides and to a projector or viewer matching said cassette.

More specifically the invention relates to an endless cassette by which, together with the matching viewer or projector, slides, particularly mounted films, a continuously and endlessly moved one by one in sequence through a light beam emanating from a source of light. This means that in due course each slide will be returned to its initial position and will again be projected on the screen.

The only available endlessly operating device for mounted films has been the rotary carrousel tray which, however, requires for endless operation large numbers of slides, is very complicated in regard to the orderly insertion of the slides, is very expensive and too bulky for convenient storage.

The object of the invention is the provision of a cassette or the like for slides which overcomes the above mentioned drawbacks, which is small and inexpensive, which receives only a relatively small number of slides, which allows easy loading of the slides into it, and which is easy to operate.

A further object of the invention is the provision of a projector or viewer adapted for the reception operation of the new cassette.

With these aims and objects in view the new cassette comprises two compartments adapted for holding one stack of slides each and each having a bottom wall; a structure connecting the two compartments at a distance from each other equaling at least the width of one slide; a slot in said connection structure communicating with both said compartments, being arranged in the plane of the bottom of at least one of said compartments, being provided with an opening equalling the portion of a slide to be projected and being adapted for insertion between a light source and a focussing lens of a projector or viewer.

A further feature of the invention consists in a projector or viewer provided with a protrusion adapted for holding the connecting structure of the cassette and housing a mirror or prism deflecting light passing through a slide toward a screen.

The new cassette and projector or viewer are particularly well suited for slides holding Kodak's 110 Film, and may preferably receive 20 to 36. Once the slides are inserted into a cassette they may remain there for viewing, projection and permanent storage, the latter because the cassettes are so inexpensive as to permit their use as permanent rectacles for the slides.

Further features, details, objects, and advantages of the invention are disclosed in the following description of several embodiments in conjunction with the illustration of such embodiments in the attached drawings in which:

FIG. 1 is a perspective of one embodiment of the viewer with a cassette attached thereto;

FIG. 2 is a slide elevation of the same viewer;

FIG. 3 is a perspective of one embodiment of the new cassette on a larger scale, the front wall being shown detached so as to more clearly illustrate the underlying construction;

FIG. 4 is a fragmentare front elevation and section of the viewer along line 4—4 of FIG. 1 as seen in the direction of the arrows on said line but on a larger scale than FIG. 1;

FIGS. 5,6 and 7 are fragmentary sections along lines 5—5, 6—6 and 7—7, respectively, of FIG. 4, showing details of the viewer and FIG. 7 also details of the cassette;

FIG. 8 is a fragmentary section on a smaller scale than and along line 8—8 of FIG. 7, showing particularly details of the cassette;

FIG. 9 is a perspective on a smaller scale of another embodiment of a cassette though the cassette of the type shown in FIGS. 1 to 3,7 and 8 is preferred for the reasons to be explained in the following;

FIG. 9a is a sectional view along line 9a—9a of FIG. 9;

FIG. 10 is a partial inside elevation of the viewer, as seen in the direction on the arrows on line 10—10 of FIG. 2 and on about the same scale as FIGS. 4 and 7;

FIG. 11 is an inside view similar to that of FIG. 10 but depicting a motor driven slide changer rather than the hand operated one of FIGS. 1, 2, 4 and 11;

FIG. 12 is an enlarged view of a switching device; and

FIGS. 13 to 15 are fragmentary sections in a plane corresponding about to the plane of line 4—4 of FIG. 2 but showing in different positions of adjustment a modification of viewer and cassette permitting reversal of the feeding of the frames.

FIGS. 1 and 2 show the general constructions and arrangement of a viewer 20 and of a slide magazine, box, tray or cassette 21 attached thereto, embodying the invention.

The viewer 20 comprises a main housing 22 with a ground glass screen 23 and an inner deflecting mirror 24, the latter mounted on a rear door 25 hingedly attached along its upper margin to the housing 22.

In a forward opening of housing 22 there is secured a mounting plate or chassis 26 carrying, as shown in FIGS. 4 and 7, an outwardly protruding first casing 27 open at the bottom and at the rear A mirror 28 in the interior of the casing is inclined with respect to the open sides of casing 27. The open rear of casing 27 is adjoined by a focussing and enlarging lens 29 slideably adjustable by means a lever 30, the latter having an outwardly projecting handle or knob 30a.

In a second casing 31 secured to plate 26 and arranged beneath the lower opening of the first casing there are mounted, as shown in FIGS. 4,7 and 8, a light source 32, a reflector 33 and condenser lenses 34. A knob 35 (FIG. 1) serves for switching the light source on and off. 36 is a removable cover.

A lower rod 37 and an upper rod 38 are slideably mounted on the inside of plate 26 by means of screws 39, as shown in FIG. 10, with racks 40 provided on rods 37, 38 are engaged by a pinion 41 and the latter by pinion 42 both being rotatably mounted on plate 26. A tooth segment 43 is journaled by shaft 44 to plate 26 engages pinion 42, is biased in on direction by spring 45 and movable in the other direction by a lever 46 secured to shaft 44, arranged on the outside of plate 26 and provided with a knob or handle 46a.

One end of each rod 37, 38 is provided with an outwardly bent-off extension 47 and 48, respectively, which extends through a horizontal slot 49 and 50, respectively of plate 26. Extension 47 of lower rod 37 carries an upwardly directed pin 51 and that of upper rod 38 a downwardly directed pin 52.

Pushing down the end of lever 46 in the direction of arrow 53 against the bias of spring 45 causes the rods 37 and 38 to move in opposite directions—arrows 54, 55 in FIG. 10—the return movement being limited by the resilient abutments 56, 57. The abutment 56 may serve as a switch for turning on light source 32.

Instead of operating the rods by hand via segment 43 and lever 46 they may also, as diagrammatically illustrated in FIGS. 11 and 12, be continuously reciprocated by a reversible electric motor 61, the shaft of which engages by means of intermediate pinions (not shown) the pinion 41 and the direction of rotation of which are reversed by a suitable switching device 62, 63.

The cassette, cartridge, tray, box or magazine 21, as shown in FIGS. 1, 2, 3, 7 and 8, comprises an outer rectangular casing 65 and a smaller inner casing 66.

The outer casing has bottom and top walls 67, 68, a rear or inner wall 89, a (preferably removable) front wall 70, and end walls 71, 72. Rear wall 69 is provided with a middle opening 73 permitting the entry of casing 27 of the viewer 20, and its bottom wall 67 is provided with a middle opening 74 of a size at least equalling the size of the picture of the slide to be projected or viewed.

The inner casing 66 is open at the rear, secured to the rear wall 69 along the margines of the latter's opening 73 and of a size to snugly fit over the casing 27 of the viewer. The lateral or side walls 75, 76 of inner casing 66 leave between them and the end walls 71, 72 of the outer casing 65 compartments 77, 78 permitting the insertion of one stack each of horizontally arranged slides 79, whereas there are narrow passages 80, 81 between the bottom and top walls 82, 83 of inner casing 66 and the respective bottom and top walls 67, 68 of outer casing 65, the passages being of a width permitting the movement therethrough of a single slide 79 at a given time. Bottom wall 82 of inner casing 66 has an opening 84 of about the same size as and in registry with the opening 74 in bottom wall 67 of outer casing 65.

Bottom and top walls 67, 68 and the adjoining margins of the end walls 71, 72 of outer casing 65 are provided with slots 85, 86 permitting the entry of and the movement therein of the pins 51, 52 on rods 37,38. Leaf springs 87 secured in the region of compartment 78 in recesses of the bottom wall 67 of outer casing 65 has in the region of compartment 78 an inclined portion or ramp 84 on the side of inner casing 66 and has in unbiased state a height equalling or surpassing the thickness of one slide. A second pair of leaf springs 88 which may be integrally formed with the springs 87, are secured in recesses of bottom wall 67 beneath the inner casing 66 and provided with inclined end portions or ramps. The springs 87a serve for urging a slide 79 in passage 80 against bottom wall of inner casing 65.

The side walls 75, 76 of the inner casing 66 lean slightly to one side, in FIG. 8 to the left, so as to render the movement of the slides more easy and smooth.

The operation of the cassette and the viewer should be practically self-explanatory from the drawings and the foregoing description of FIGS. 1 to 8 and 10 to 12. After slides 79 hve been inserted in the compartments 78 and 79 in removing and then reinserting front wall 70, inner casing 66 of the cassette 21 is slid over casing 27 of the viewer 20. Upon switching on the light source 32 one slide 79 after the other may, by moving the rods 37, 38, be brought in registry with the openings 74, 84 and thus in the path of the light beam emanating from condenser lens 34 thus projecting the image of the respective slide onto screen 23.

For continuous operation it is necessary to provide at least three more slides as the number of slides filling compartment 78 to the top. On the other hand, both compartments may be filled to such an extent only as to leave room for shifting at least one slide from one compartment to the other one. For certain given dimensions of slides and compartments, the minimum number of slides is 20 and the maximum number 36.

With the door 25 closed as indicated in FIG. 2, the rays 88 emanating from focussing lens 29 are deflected by mirror 28 toward screen 23. However, by opening door 25 inwardly together with the mirror attached to it, the rays 88 may pass, as indicated by lines 89, through the door opening onto a large screen or wall.

The simplified cassette, tray or magazine 90 illustrated in FIGS. 9 and 9a has compartments 91, 92 held together by a connecting structure 93 which again provides a slide passage 94 on the level of the bottom 95 of compartment 91, while compartment 92 extends downwardly from that level. Bottom 95 is provided with a slot 96 for the entry of pin 51 on rod 37 whereas pin 52 on rod 38 would move without performing any function. Besides, cassette 90 may be provided with a slide 97 of its own, which extends with knob 98 outwardly through a slot 99 and may engage and move one slide after another by the hook 100 attached to such slide. Evidently, this cassette 90 does not permit continuous movement of the slides around and around and is not suited for storage of a supply of slides in a selected sequence. The advantage of cassette 90 is its simplicity, its compatability for operation by the viewer or projector 20 designed for cassette 21, and the convenience in loading it with loosely available slides.

The embodiments of the cassettes and of the viewer or projector shown in FIGS. 1 to 12 do not permit reversal of the movement of the slides, which reversal would be desireable if a just passed on slide should be viewed again for one reason or another. Such reversal of the direction of the sequence is enabled by the modified cassette 101 and viewer diagrammatically illustrated in FIGS. 13 to 15. In this embodiment, the outer cassette casing 102 has its bottom wall 103 provided with one opening 104, 105 beneath each compartment 106, 107 at the sides of inner casing 108 and bottom wall 103 and top wall 109 are each provided with two slots (not shown), one each in the region of each compartment 106, 107. A double armed lever 110 is journaled at 111 to the viewer (otherwise not shown) and carries plungers. 112, 113 with the interposition of springs 114. The plungers 112, 113 are movable in guides 115 and in registry with the openings 104, 105. By flipping lever 110 in gripping the knob 116 at one of its ends, either one of the plunger may be brought to bear against the stack of slides 117 in one of the compartment 106 or 107. Flipping the lever 110 also moves one set or the other of two sets of transport pins 118, 119 or 120, 121 in a position where the respective pins will engage and move the slides at the bottom or the top of the respective stack. FIG. 13 shows lever 110 and pins 118 to 121 in neutral position, FIG. 14 in the position for feeding the bottom slide from right hand compartment 106 into projecting position, and FIG. 15 in the position for feeding the bottom slide of the stack in left hand compartment 107 into projecting position beneath inner casing 108. It is believed not necessary to illustrate and describe once again how the pins 118 to 121 are supported on slides and how the slides are driven because this should be obvious to an expert after having seen the first embodiments shown in FIGS. 1 to 12 and read the foregoing detailed description thereof.

While there have been described what at present is considered to be the preferred embodiments of this invention it will by obvious to those skilled in the art that various changes and modifications may be made therein without departing from the invention and it is therefore aimed in the appended claims to cover all such changes and modifications as fall within the spirit of this invention.

What is claimed is:

1. A viewer and a cassette, which cassette includes planar upper and lower walls and is in the general form of a parallelepiped and which includes two compartments, each compartment having a cross-section corresponding to the dimensions of slides adapted to be received therein and adapted for holding stacks of slides, each compartment having an end wall and a separate box-shaped structure interposed between and connecting the two compartments and having at least one open end, passages at the top and bottom of said connecting structure communicating with both said compartments, the lower wall of said cassette being provided centrally with a first opening of a size corresponding to a slide to be projected, said box-shaped connecting structure also provided with an opening aligned with said lower wall cassette opening, said viewer having a housing provided with a light source, a condenser lens and a focusing lens, a protruding, hollow supporting element provided on said housing and removably entering said open end of said box-shaped connecting structure and supporting said cassette, with said openings optically aligned with said condenser lens and said focusing lens.

2. The viewer and cassette according to claim 1 in which the said condenser lens is arranged with its optical axis in vertical position, in which said protruding supporting element releasably holds said connecting structure of said cassette with its said passages in horizontal position, in which said focusing lens is arranged with its optical axis in horizontal position, and in which said protruding supporting element is interiorly provided with a reflector for deflecting light from said condenser lens to said focusing lens.

3. The viewer and cassette according to claim 1 including at least one pin member movable back and forth, one of said compartments having a slot in a wall thereof, said pin member extending into said slot and adapted to engage a slide at the bottom of said one compartment and to push it through one of said passages in the said connecting structure of said cassette, and means for moving said pin member back and forth.

4. The viewer and cassette of claim 2 wherein said protruding supporting structure is hollow and internally carries a mirror positioned in said optical axis.

* * * * *